United States Patent [19]

Snyder

[11] 3,951,817
[45] Apr. 20, 1976

[54] SEWAGE TREATMENT TANK AND TUBE SETTLER

[75] Inventor: John R. Snyder, Eastlake, Ohio

[73] Assignee: Jet Aeration Company, Cleveland, Ohio

[22] Filed: June 26, 1974

[21] Appl. No.: 483,457

[52] U.S. Cl. .............................. 210/521; 210/220
[51] Int. Cl.² ......................................... B01D 21/00
[58] Field of Search ........... 210/170, 195, 197, 220, 210/221, 521, 522, 532 S, 150, 151; 261/112; 403/246, 263, 349, 353

[56] References Cited
UNITED STATES PATENTS

| | | | |
|---|---|---|---|
| 1,166,345 | 12/1915 | Gates | 403/349 X |
| 2,260,048 | 10/1941 | Newell | 403/353 X |
| 3,195,727 | 7/1965 | Kibbee | 210/195 |
| 3,206,032 | 9/1965 | Nottingham et al. | 210/195 |
| 3,400,918 | 9/1968 | MacLaren | 210/220 X |
| 3,472,764 | 10/1969 | Culp et al. | 210/195 X |
| 3,491,892 | 1/1970 | McCann | 210/521 |
| 3,507,393 | 4/1970 | Weis et al. | 210/195 |
| 3,545,617 | 12/1970 | Hamrick | 210/532 S |
| 3,615,025 | 10/1971 | Rice et al. | 210/521 |
| 3,618,778 | 11/1971 | Benton et al. | 210/150 |
| 3,630,370 | 12/1971 | Quina | 210/532 S X |
| 3,669,425 | 6/1972 | Copeland | 261/112 X |
| 3,741,401 | 6/1973 | Hsiung | 210/521 X |
| 3,788,477 | 1/1974 | Love | 210/195 |
| 3,796,018 | 3/1974 | Holmstrom | 403/349 X |
| 3,805,957 | 4/1974 | Oldham et al. | 210/195 X |

*Primary Examiner*—Charles N. Hart
*Assistant Examiner*—Robert H. Spitzer
*Attorney, Agent, or Firm*—Woodling, Krost, Granger and Rust

[57] ABSTRACT

A sewage treatment tank formed in upper and lower halves which engage each other along a parting line. The tank has an aeration chamber and an outlet chamber which are fluidly connected together at the bottom portion of the tank through an opening and also at the top portion of the tank at the fluid level by means of a surface skimmer. A tube settler is positioned in the outlet chamber and comprises a plurality of spaced and generally parallel plates each of which includes a plurality of spaced and generally parallel deflector members the surfaces of which are arranged at an acute angle to upward fluid flow in the outlet chamber. Holding members secure the plates in fixed position and have end portions held between the upper and lower halves of the tank at the parting line.

5 Claims, 10 Drawing Figures

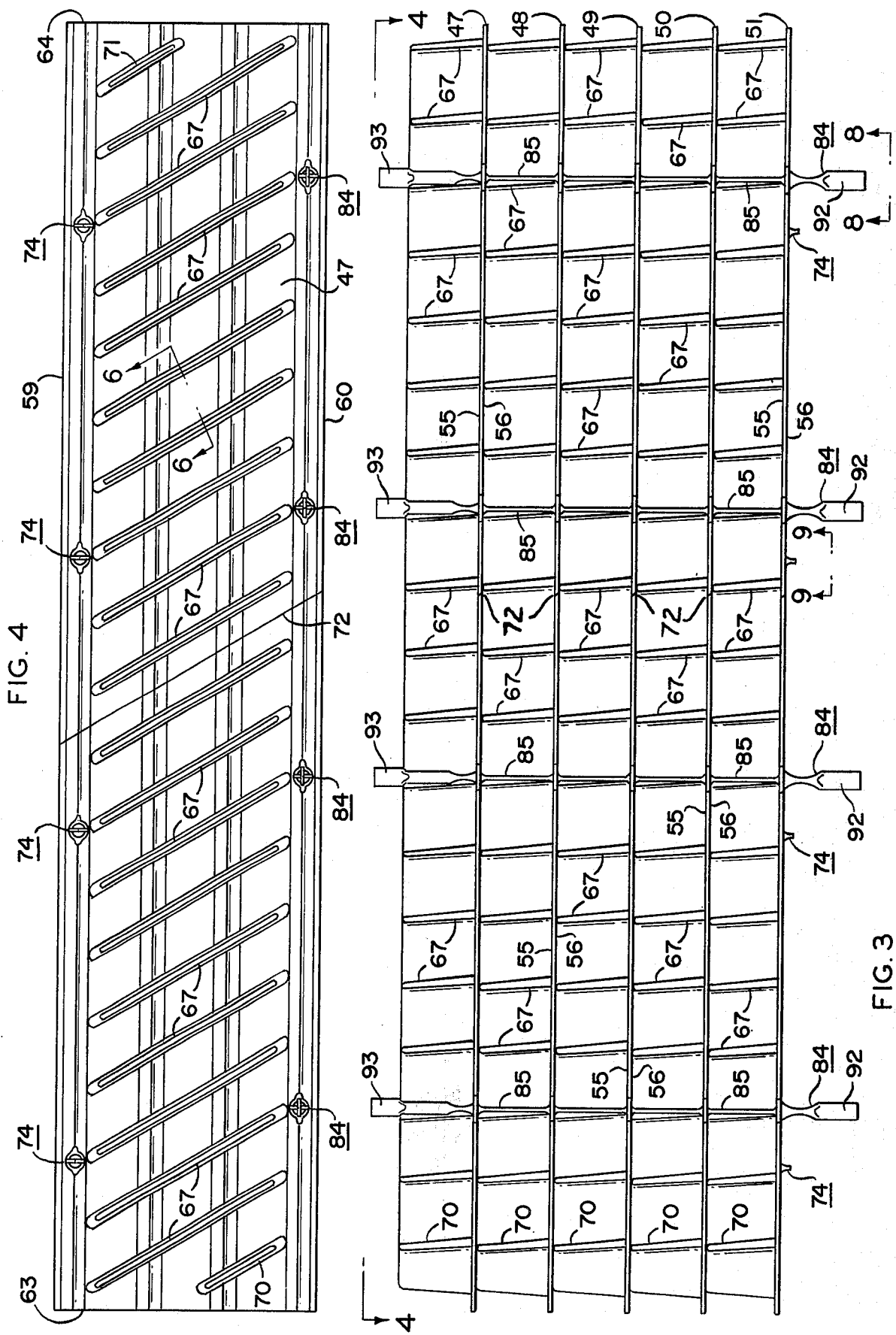

SEWAGE TREATMENT TANK AND TUBE SETTLER

In the design of sewage treatment systems, particularly those used by single family dwellings, it is common to utilize a treatment tank having a plurality of chambers. In many systems there is an aeration chamber and an outlet or settling chamber. Fluid connection may be obtained between these two chambers by means of a space between the bottom of a vertical wall which separates the two chambers, and the floor of the tank.

Mechanical agitation of some sort usually occurs in the aeration chamber with attendant air injection into the water carried solids and this may cause undesirable fluid currents in the settling chamber which in turn may cause solid particles to rise to the surface of the settling chamber and escape through the outlet thereof.

The present invention addresses itself to preventing the escape of solid particles from the outlet of the settling chamber. This invention accomplishes this in a unique way by the combination of a tube settler intermediate the top and bottom portions of the settling chamber and a surface skimmer at the liquid level of the tank. The surface skimmer provides a conduit between the aeration and settling chambers whereby solids on the surface of the liquid in the settling chamber are drawn into the aeration chamber for retreatment. The tube settler acts as a baffle to eliminate cross currents which impair settling and, also, acts to provide surfaces for engagement with rising particles which when so engaged fall or are deflected to another surface where they collect and form into larger particles which more easily settle to the bottom of the settling chamber. The tube settler may or may not be used in combination with the referred to surface skimmer.

The present invention also relates to the unique construction of the tube settler which enables the components thereof to be stacked into a minimum space for storage and shipment and which components can be quickly and easily assembled when desired at the job site.

Other objects and a fuller understanding of this invention may be had by referring to the following description and claims, taken in conjunction with the accompanying drawings, in which:

FIG. 3 is an enlarged view of the tube settler which is shown in FIG. 2;

FIG. 4 is a view taken generally along the line 4—4 of FIG. 3;

Figure 2:
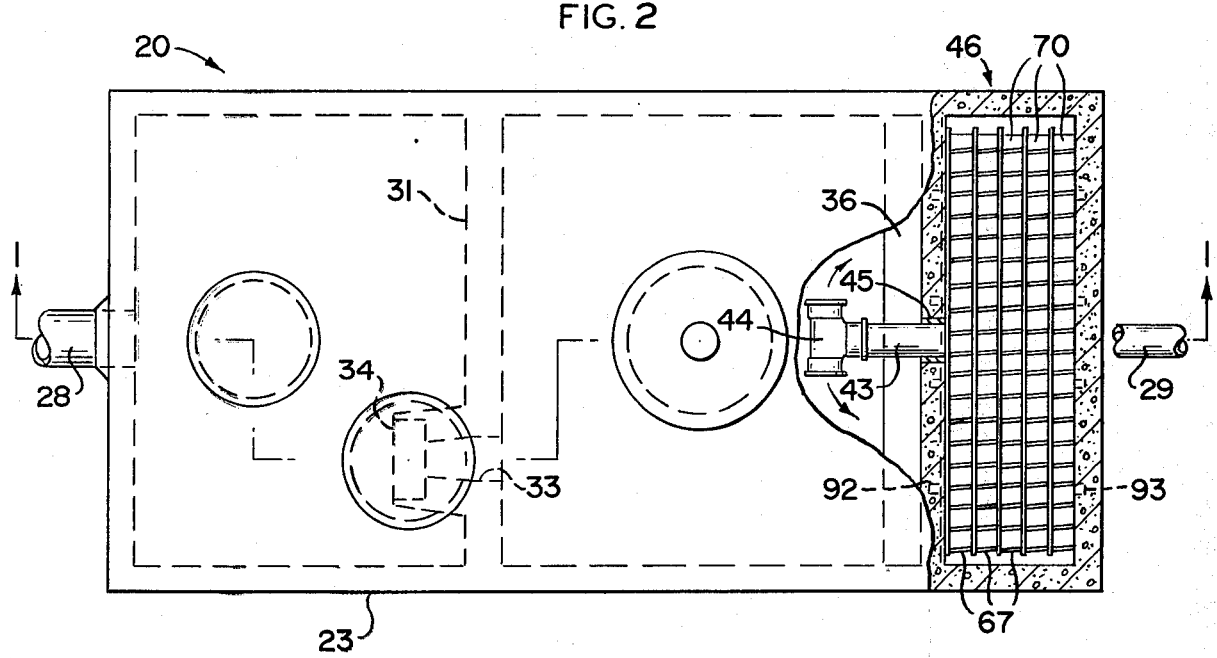
FIG. 2 is a plan view of FIG. 1, partially in section.
Figure 1:
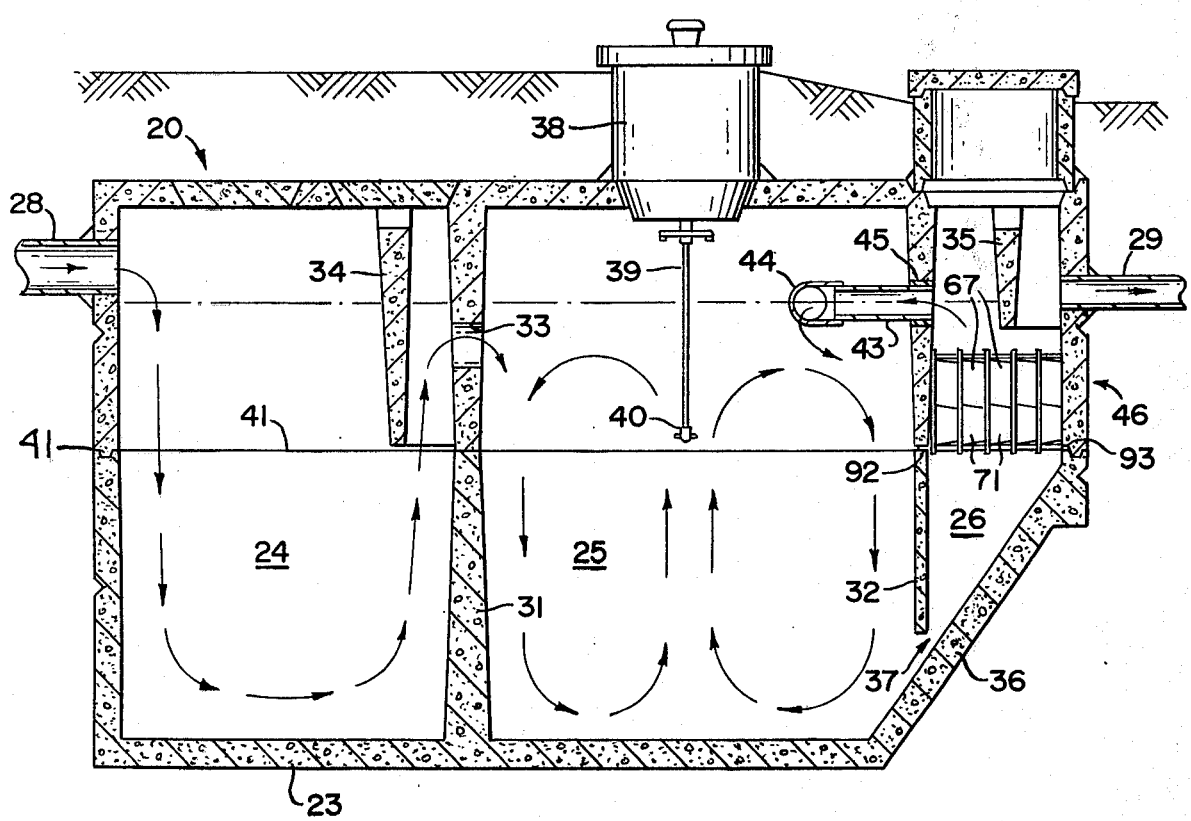
FIG. 1 is a side elevational view partially in section showing a sewage treatment system incorporating the teachings of the present invention.

FIGS. 1 and 2 show a sewage treatment system indicated generally by the reference numeral 20 and this sewage treatment system includes a tank 23 which has inlet, aeration and outlet chambers identified by the reference numerals 24, 25 and 26, respectively. The inlet and aeration chambers are separated by a wall 31 and the aeration and outlet chambers are separated by a wall 32. It will be noted that the wall 32 extends vertically downwardly and terminates just short of a sloping wall 36, to define an opening 37 which provides for the passage of effluent from the aeration chamber 25 to the outlet or settling chamber 26. The tank 23 is provided with an inlet 28 for the entrance of effluent into the system and is provided with an outlet 29 to provide for the exit of treated effluent. Baffles 34 and 35 are provided in the inlet chamber 24 and the outlet chamber 26, respectively. An electric motor 38 is positioned above the aeration chamber and is provided with a shaft 39 and secured to the lower-most end of the shaft 39 is an aeration head 40. In treating effluent within the aeration chamber the electric motor is energized thereby rotating the shaft 39 as well as the head 40. This causes a mechanical agitation of the effluent and provision is made to draw air down the shaft 39 which is hollow and eject the air through the head 40 into the effluent. An opening 33 is provided in wall 31 so that effluent may pass from the inlet chamber 24 into the aeration chamber 25.

A surface skimmer assembly is provided in wall 32 which divides or separates the aeration and outlet chambers 25 and 26. The surface skimmer assembly includes a straight section of pipe 43 located in wall 32 and a sleeve 45 of plastic material serves to mount this straight section of pipe in this position. The sleeve 45 is cast into the wall 32 when the tank is originally made. The straight section of pipe 43 (also of plastic) is secured in the sleeve 45 as shown and held in this position by glue or other equivalent means. The end of the straight section of pipe 43, within the aeration chamber, terminates in a T-connection 44 which serves to provide two outlets for solid and/or fluids which are drawn through the pipe 43 from the outlet chamber into the aeration chamber. This surface skimmer assembly performs the function of taking solids from the surface of the liquid in the outlet chamber 26 and drawing them into the aeration chamber 25 for further treatment. The action which causes these materials to be drawn into the aeration chamber is brought about by the movement of fluid in the aeration chamber which movement of fluid is caused by the motor 38, shaft 39 and head 40. The movement of fluid past the outlet openings of the T-connection 44 can be likened to a venturi action which causes a drop in pressure and hence movement of fluid from the outlet chamber into the aeration chamber. It will be noted from viewing FIG. 1 that the tank 23 is made in two parts, primarily an upper part and a lower part and these two parts come together along a parting line 41.

A tube settler assembly 46 is positioned in the outlet chamber 26 intermediate the top and the bottom of this chamber. The position of the tube settler assembly in this chamber can best be seen in FIGS. 1 and 2. FIGS. 3 through 9 show in more detail the precise construction of the tube settler assembly 46. The tube settler assembly includes what have been referred to herein as plates and these plates are identified by the reference numerals 47 through 51. The plates 47 through 51 are identical in configuration and are preferably constructed of a plastic material which can be vacuumed formed. For the purpose of identification, each of the plates 47 through 51 has what will be referred to as a first face 55 and a second face 56. The perimeter of the plates are defined by two side edges 59 and 60, as well as two end edges 63 and 64, respectively. Extending from the first face 55 of each of the plates, as an integral part thereof, are a plurality of deflector members all identified by the reference numeral 67 since they are all substantially identical in size and in the direction they extend. Located at the end edges 63 and 64 are shorter deflector members identified by the reference numerals 70 and 71. All of the deflector members are formed as an integral part of the plate with which they are associated by a vacuum forming process. The deflector members form what will be referred to as a tapering chamber as they extend outwardly (See FIG. 6). The chambers are elongated in nature having side walls, which taper toward each other as they extend away from the plate to which they are connected and these elongated chambers, also, have opposed end walls. Each of the plates is severed along what has been referred to as a cut line 72 and the main purpose of cutting or severing each of the plates along this line is for more ease in shipping the plates from the manufacturing point to the site of final assembly and use. It will thus be seen that the deflector members 67, 70 and 71 extend at an acute angle to the extent of the plates or it may be said that the deflector members extend at an acute angle to the side edges 59 and 60. It will, also, be observed that the deflector members extend in a plane which is generally normal or at right angles to the plane in which the faces 55 and 56 reside.

Figure 5:
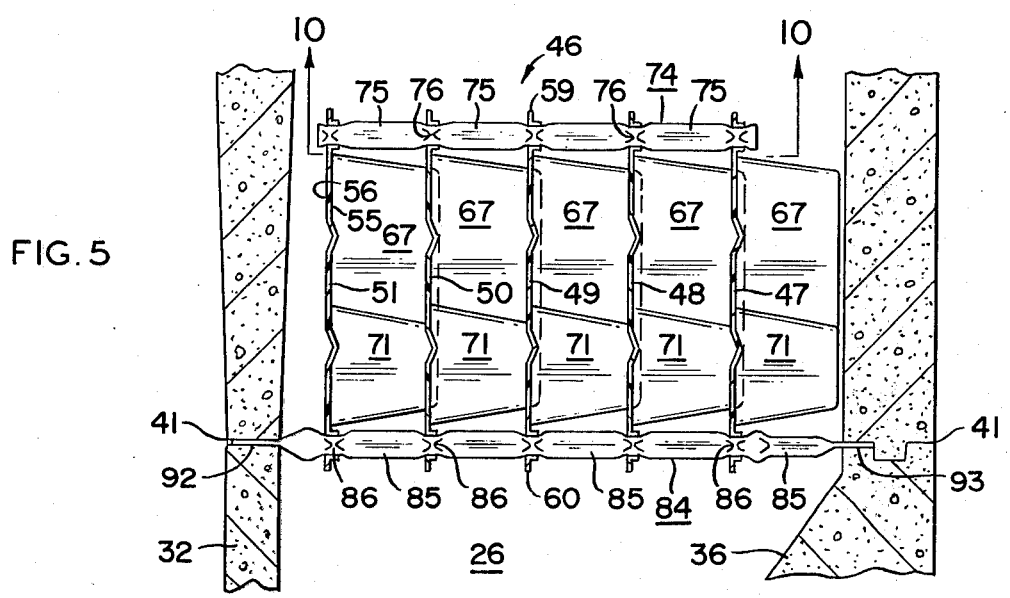
FIG. 5 is a view of the tube settler taken in the same direction as FIG. 1.
Figure 6:
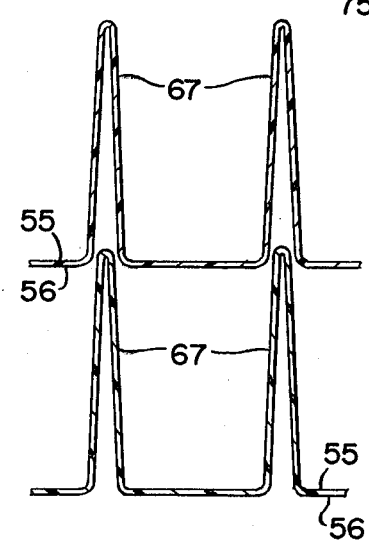
FIG. 6 is a view taken generally along the line 6—6 of FIG. 4.
Figure 10:
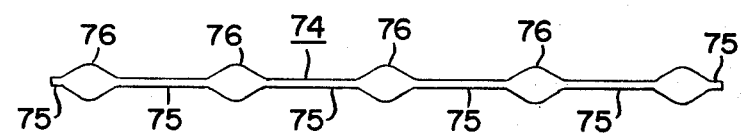
FIG. 10 is a view taken generally along the line 10—10 of FIG. 5.
Figure 7:
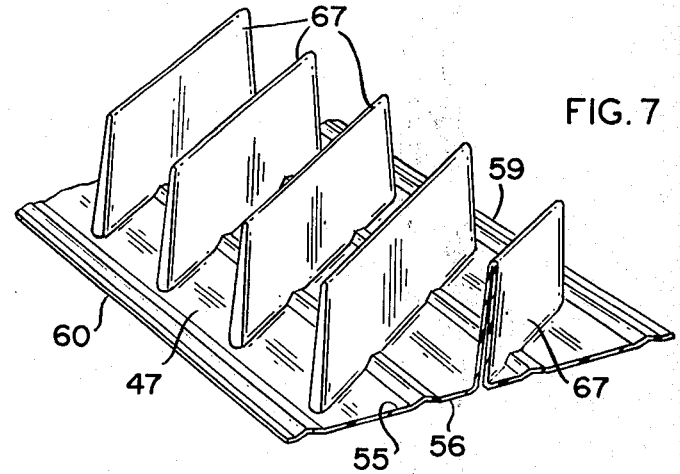
FIG. 7 is a fragmentary isometric view of one of the five plates which make up the tube settler assembly as shown in FIGS. 1 through 5.
Figure 9:
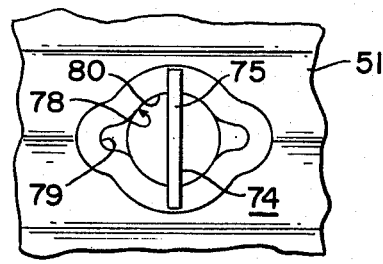
FIG. 9 is a view taken generally along the line 9—9 of FIG. 3.

Means are provided for holding the plates 47 through 51 in their assembled condition or in other words in the condition shown in FIGS. 2, 3 and 5 and for the purpose of discussing or describing the assembly of the plates, it will be simply assumed that the plates have not been severed along the diagonally extending cut line 72. In order to assemble the plates 47 through 51 it is preferred that these plates all be spaced apart an approximate distance, of say on the order of three inches, and they are placed so that the side edges 59 are resting upon a support surface. It will be noted in each of the plates 47 through 51 there are provided four openings 78 (FIG. 9), each of which is provided with a configuration which produces a large dimension 79 and a small dimension 80. There are, also, provided four first locking support members 74 all of which are identical in their construction and as will be noted from FIGS. 5 and 10, these locking support members 74 are provided with what are referred to as large dimension portions 75 and small dimension portions 76. The support members 74 are inserted through the openings 78 and they are initially inserted so that the large dimension portions 75 corresponding to the large dimension 79 of the openings. Referring to FIG. 9, it can be seen that the members 74 are inserted into the openings 78 in a position which is 90 degrees from the position shown in this Figure. After the support members 74 have been extended through corresponding openings 78 in all plates, to a position as indicated in FIG. 5, the locking support members 74 are rotated 90 degrees to the position shown in FIG. 9 which then serves to hold all of the plates 47 through 51 in spaced relation to each other. FIG. 5 shows the plates held between the spaced large dimension portions 75.

Figure 8:
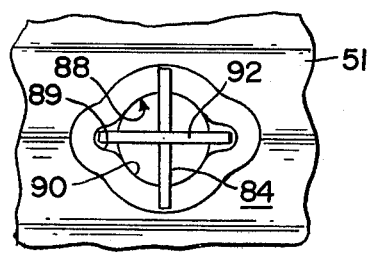
FIG. 8 is a view taken generally along the line 8—8 of FIG. 3.

The plates are then positioned so that side edges 60 are resting upon a support surface so the final assembly can be accomplished. To accomplish the final assembly, there are provided four identical second locking support members 84 each provided with large dimension portions 85 and small dimension portions 86. Additionally, each of the support members 84 is provided with a first flat support end 92 on one end and at the other end a second flat support end 93. Each of the plates is, also, provided with four openings 88 and each has a large dimension 89 and a small dimension 90 (FIG. 8). The openings 88 are identical to the openings 78; however, they have been given different reference numerals to aid in understanding the assembly of the device. In order to assemble the support members 84 within the openings 88, the members are inserted through each opening 88 in such position that the first flat support end 92 is aligned with the large dimension 89 of opening 88 and once it has been inserted through the opening it must be rotated 90° so that a large dimension portion 85 will be aligned with the large dimension of the opening and can pass therethrough. As soon as a large dimension portion 85 has passed through the large dimension portion 89 of the opening, then the support member must be rotated another 90° to permit the first flat support end 92 to negotiate the large dimension portion of the next aligned opening 88. This procedure is repeated until all of the second locking support members 84 have been extended through all of the plates to the positions best observed from viewing FIGS. 3 and 5. After this has been accomplished, the tube settler assembly 46 is ready to be installed in the tank 23. Members 74 and 84 are preferably constructed of a plastic material.

The ultimate position of use of the tube settler has been shown in FIGS. 1 and 5 of the drawings. The tube settler assembly is placed in position with support ends 92 and 93 in contact with the bottom part of the tank at the parting line 41 and then the top part of the tank 23 is brought into position engaging ends 92 and 93 as shown.

Before discussing the operation of this invention it will be observed that the present system will function with either the surface skimmer assembly or the tube settler assembly or it will function with these two components in combination with each other. In operation the electric motor 38 is energized rotating the shaft 39 and head 40 which causes air injection to assist the anaerobic bacterial decomposition of the sewage in the aeration chamber. The mechanical action causes fluid flow as generally indicated by the arrows in the drawing. Treated effluent travels from the aeration chamber 25 into the outlet chamber 26 through opening 37 and there are particles which move upwardly through outlet chamber 26. These particles will engage the deflector members 67, 70 and 71 and when they do they have a tendency to be deflected or fall to another deflector member where a given particle will collect or combine with other particles forming a large particle which will have a greater tendency to fall downwardly through the outlet chamber and back into the aeration chamber for further treatment. Particles or other solids which rise to the surface of outlet chamber 26 tend to be drawn by the venturi action through the surface skimmer assembly and reinjected into the top portion of the aerator chamber 25 through the T-connection 44. The tube settler assembly 46 in addition to providing a greater surface area for the engaging of particles, also, acts as a baffle arrangement which tends to eliminate cross currents in the outlet chamber and, therefore, assures better settling out of particles and less tendency for them to pass out of the system through outlet 29.

Referring to the specific construction of the tube settler assembly 46, it will be noted that it is designed with the minimum number of physical components. In other words, the tube settler assembly is extremely convenient and economical to manufacture, extremely compact and efficient to ship and extremely simple and capable of quick assembly when it reaches the job site. The tube settler assembly consists of the plurality of plates 47–51 all of which are identical in configuration and construction and all of which can be produced by the same vacuum forming operation out of a synthetic plastic material. In addition to the plates, the only other necessary components are the support members 74 and 84 which cooperate with the openings 78 and 88 which openings are identical in configuration. As mentioned before, each of the plates 47 through 51 are severed along the diagonal cut 72 and this is primarily done for shipping purposes. Referring specifically to FIG. 4, it will be seen that if the left portion of the plate 47 is simply rotated through 180°, that the end edge 63 can be brought over and placed upon the end edge 64 and all of the deflector members will fit down over each other thereby resulting in a very compact assembly for shipping the plates from the point of manufacture to the point of assembly. This means of packing can of course be duplicated for shipping any number of plates as above described.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube settler including in combination a plurality of spaced and generally parallel plates, each said plate having first and second faces, opposed side edge portions and opposed end edge portions, each said plate having a plurality of spaced and generally parallel deflector members integrally connected to and extending outwardly from said first face thereof and terminating adjacent and spaced from said second face of an adjacent plate, each said deflector member having wall means which define an elongated chamber having side walls which taper toward each other as they extend away from the plate to which they are connected, said elongated chamber, also, having opposed end walls, said deflector members extending outwardly generally normal to said plates and extending in a direction which is at an acute angle to the side edge portions of said plates, and means for holding said plates in their spaced and generally parallel relationship.

2. A tube settler as claimed in claim 1, wherein a deflector member where it terminates adjacent an adjacent plate resides slightly within the chamber formed by a deflector member of said an adjacent plate at the larger portion of said chamber.

3. A tube settler as claimed in claim 1, wherein said means for holding said plates comprises aligned openings in said plates and holding members extend through said openings and have wall means engageable with said plates to hold said plates in position.

4. A tube settler as claimed in claim 3, wherein said openings in said plates have a large dimension and a small dimension and said holding members have axially spaced enlarged portions corresponding in dimension to said large dimension of said openings connected by axially spaced small portions corresponding in dimension to said small dimension of said openings whereby said holding members may be inserted through said openings with said enlarged portions aligned with the large dimension of said openings and when so inserted may be rotated ninety degrees to locate an enlarged portion to opposite sides of each opening in line with the small dimension of the opening.

5. A tube settler as claimed in claim 4, wherein at least some of said holding members have flat portions on their opposed ends to support said tube settler.

* * * * *